April 21, 1970  A. SOUTHERLAND, JR., ET AL  3,507,241
DEEP SUBMERGENCE RESCUE VEHICLE HANDLING SYSTEM
Filed Nov. 26, 1968  2 Sheets-Sheet 1
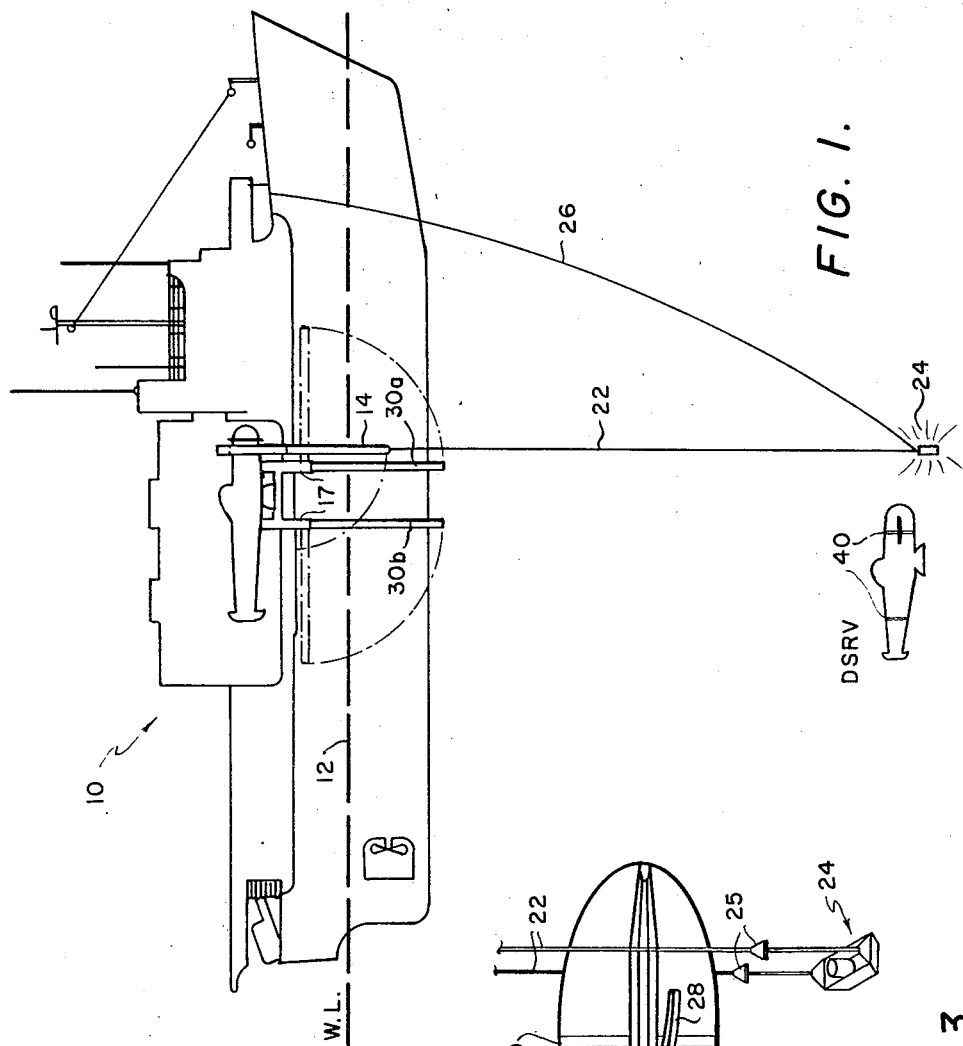
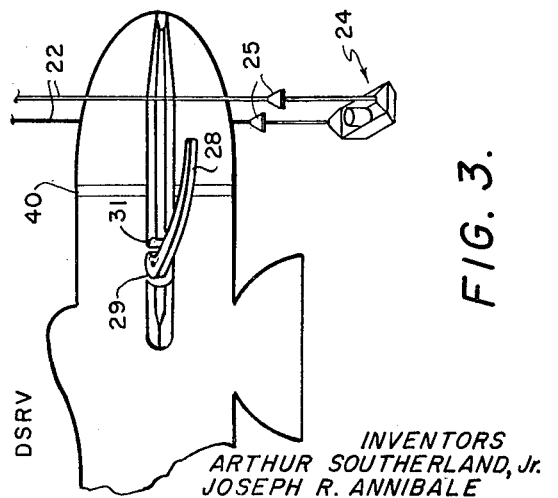
INVENTORS
ARTHUR SOUTHERLAND, Jr.
JOSEPH R. ANNIBALE
PAUL V. ADAMS
WILLIS H. TODD
BY
AGENT
ATTORNEY INVENTORS
ARTHUR SOUTHERLAND, Jr.
JOSEPH R. ANNIBALE
PAUL V. ADAMS
WILLIS H. TODD United States Patent Office 3,507,241
Patented Apr. 21, 1970

3,507,241
DEEP SUBMERGENCE RESCUE VEHICLE
HANDLING SYSTEM
Arthur Southerland, Jr., Washington, D.C., Joseph R. Annibale, Fairfax, Va., Paul V. Adams, Wheaton, Md., and Willis H. Todd, Mystic, Conn., assignors, by direct and mesne assignments, to the United States of America as represented by the Secretary of the Navy
Filed Nov. 26, 1968, Ser. No. 779,164
Int. Cl. B63b 35/44; B63g 8/00
U.S. Cl. 114—43.5                              5 Claims

ABSTRACT OF THE DISCLOSURE

A handling system on board a ship of the catamaran type for the launch and recovery of a deep submergence rescue vehicle from below the surface. The system comprises capturing cables suspended into the water from the ship, at the lower ends of which is attached a sensor platform having strobe lights, a sonar device and TV cameras. Positioning arms mounted on the ship for rotation in parallel vertical planes guide the upper ends of the cables. The deep submergence vehicle homes in on the sensor platform equipment. Capturing arms on the deep submergence rescue vehicle guide the cables into the engagement sockets. The cables draw the deep submergence rescue vehicle into positive engagement with ball ends on the positioning arms which then control the longitudinal and transverse motion of the vehicle for precise alignment of the hard lifting rings on the vehicle with the elevator cradles for subsequent hoisting from the water heave.

The invention described herein may be manufactured and used by or for the Government of the United States of America for governmental purposes without the payment of any royalties thereon or therefor.

BACKGROUND OF THE INVENTION

This invention relates generally to handling systems at the ocean-air interface and more particularly to a handling system for the launch and recovery of a deep submergence rescue vehicle (DSRV) in the open sea without the use of swimmers and where rough weather may exist.

The quickening pace of naval operations and the requirements for fast response to distress situations in adverse sea conditions has emphasized with necessity for improvements in existing handling systems. The present systems appear to be quite adequate for use in calm seas and sheltered ports, but are not at all satisfactory in adverse sea conditions where relative motion of surface and underwater vehicles may be extremely high. When it is considered that a buoyant object has six degrees of freedom, three in the vertical plane and three in the horizontal plane, and that the control of the object is frequently attempted from a second buoyant object with an entirely different set of responses to the sea state, the problem is easily visualized. Motion synchronization of two objects having individual responses must be accomplished.

One method of recovery is to provide a substantially strong couple between the two to eliminate any relative motion. Another method is to utilize a floating dry dock as the mother ship and simply draw the smaller object into engagement with cradles in the floating dry dock. A handling system used for most manned submersibles employs deck cranes operating over the side or stern of the mother ship but this method is not entirely satisfactory in rough water when handling heavy and delicate submersibles carrying personnel. In the first place, the deep submergence rescue vehicle is very likely to swing into contact with the ship and cause damage as it impacts against the ship side. Also, when hoisting the vehicle over the side there is little motion synchronization due to the different amplitude and frequency responses of the two objects. As the vehicle to be hoisted aboard approaches the air-sea interface it reaches a point during which it becomes partially or completely buoyant as successive waves pass under it. Therefore, its weight is partially or totally removed from the hoisting cables on the crane by the buoyant forces of the water and then is suddenly reapplied to the cables as the wave crest passes away from the vehicle which can do considerable damage to the heavy but delicate structure of the submersible vehicle as well as to the recovery ship.

The aforementioned handling system also normally requires swimmers in the water to make the lift connection to the vehicle to be hoisted aboard which is a dangerous and time-consuming operation. It has become obvious to the Navy that there is a strong need to improve the handling systems for deep submergence rescue vehicles for better rescue, search, and salvage capability.

SUMMARY

The persent invention overcomes the aforementioned disadvantages by providing a handling system which is designed for the launch and recovery operations of a deep submergence rescue vehicle (DSRV) in rough weather. The DSRV is coupled to the mother ship by means of a submerged approach at a depth where the vehicle is not subjected to wave action of the ocean and without assistance from swimmers to make the lift connections between the vessels.

This novel system may be best understood by reference to the procedure used in launching and recovering the deep submergence rescue vehicle. The handling system is carried by a submarine rescue ship (ASR) often called a mother ship that has a catamaran type hull. This hull type was selected because this arrangement permits vehicle handling at the point of minimum motion and allows some shielding by the hull from the rough seas. The catamaran hull eliminates much of the heavy roll typical of small auxiliary ships. A deep submergence rescue vehicle (DSRV) contemplated to be handled according to this invention may be 50 feet long, 8 feet in beam, and weighs approximately 60 tons dry although the invention is not limited to any particular size of recovered vessels. The DSRV is placed into the water by an elevator through a well between the hulls of the ship. For retrieval, the DSRV homes in on the sensor platform which carries sonar and strobe light arrays and which is suspended between the hulls of the surface mother ship by two vertical cables. The DSRV slowly cruises in underwater from the stern of the mother ship to capture the vertical capturing cables by means of forwardly and laterally extending capturing arms. These arms, after encountering the cables, pivot forward to lock onto the cables, which are free to slide up and down in loosely fitting sockets near the pivot point of the arms.

The capturing cables are then reeled in by means of winches having over-riding clutches and ram-tensioners associated therewith to accommodate for the relative pitching and heaving of the two vessels. At the surface, the sockets on the DSRV come into positive engagement with ball joints located near the lower end of positioning arms. These positioning arms now are capable of controlling the longitudinal and transverse motion of the vehicle for precise alignment of the vehicle hard lifting rings with the elevator cradles, while allowing the vehicle freedom to heave and pitch. The elevator cradles are raised and brought into contact with the hard lifting ring of the vehicle. The vehicle is then raised to deck level where it may be moved to decompression chambers by means of transfer dollys.

Accordingly, it is the principal object of this invention to provide a handling system for the launch and recovery of deep submergence rescue vehicles in rough weather without the danger of damage to the heavy and delicate vehicle and without the use of human swimmers in the water to make the lift attachment.

Another object of the invention is to provide a handling system for the launch and recovery of deep submergence vehicles wherein the initial contact with the vehicle may be done from a depth below wave action and where motion synchronization between the vessel and the submergence vehicle is more readily accomplished.

Still another object of the invention is to provide a handling system for the launch and recovery of deep submergence rescue vehicles whereby the relative motion between the surface vessel and the submergence vehicle is positively controlled so as to mitigate the opportunity for damage to the submergence vehicle.

Other objects and features of the invention will become apparent to those skilled in the art upon reference to the accompanying specification, claims and drawings in which:

BRIEF DESCRIPTION OF THE DRAWINGS

FIG. 1 is a side view of a double hull or catamaran type surface ship with the capturing cables suspended below the surface of the water and a deep submergence rescue vessel coming up into position for recovery.

FIG. 3 is a detailed view of the deep submergence rescue vehicle showing its capturing arms prior to engaging the suspended capturing cables.

DESCRIPTION OF THE PREFERRED EMBODIMENT

Figure 2:
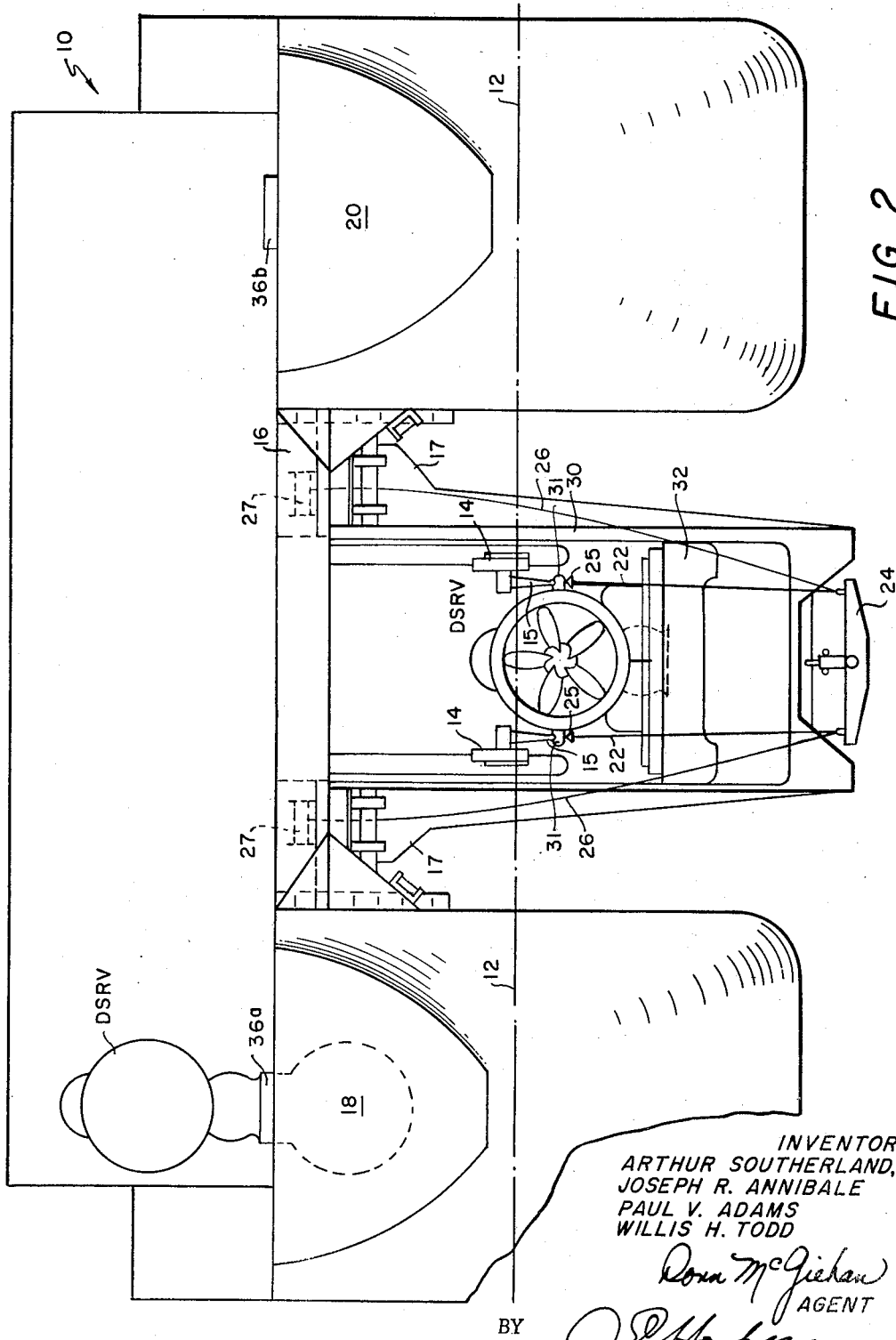
FIG. 2 is a schematic end view of the mother ship and cradled DSRV showing the elevator arms and cradles holding a deep submergence rescue vehicle.

Referring now to FIGS. 1, 2 and 3 wherein like reference numerals designate corresponding parts, there is shown a submarine rescue or mother ship 10 of the catamaran hull style floating on the surface of the ocean 12. More clearly shown in FIG. 2 are positioning arms 14 suspended from the bridge 16 which connects the two hulls 18 and 20 to form the catamaran ship. Suspended from the positioning arms 14 through the ball ends 15 are a pair of capturing cables 22 which support a sensor platform 24 having mounted thereon, a television camera, strobe light arrays and sonar equipment. Cone fittings 25 are secured to the capturing cables a short distance above the sensor platform 24. A pair of coaxial cables 26 are attached to the sensor platform 24 and thence to winches 27 on forward portion of the ship for steadying the sensor platform 24 while it is suspended in the water, as well as to provide an electrically conducting path for the operation of the electrical equipment on the platform.

The elevators 30 used to hoist the deep submergence rescue vehicle from the water comprise forward and aft elevator arms 30a and 30b which are U-shaped in design and pivoted at their open ends 17 on the surface vessel 10. As shown in FIG. 1 the aft elevator arm 30b pivots aftwardly, and forward elevator arm 30a pivots forwardly to horizontal stowed positions thus leaving an unobstructed area for handling of the DSRV. Elevator cradles 32 are contained for sliding motion within the elevator arms 30a and 30b for vertical lift via cables (not shown) in the elevator arms 30.

Decompression chambers 36a and 36b are shown mounted in each of the catamaran hulls 18 and 20 and readily receive the DSRV for air-tight connection for the subsequent transfer of the rescued personnel into the decompression chamber.

The deep submergence rescue vehicle, designated DSRV in the drawings; and particularly in FIG. 3 is shown with capturing arms 28 extended in preparation for contacting the capturing cables 22. Near the pivot 29 of arms 28, is a ball socket 31, used to loosely encircle cables 22, and to positively receive the ball ends 15 of the positioning arms 14. Hard lift bands or rings 40, encompass the DSRV, for contact with elevator cradles 32 on the surface ship 10.

DESCRIPTION OF THE OPERATION

While the description of the preferred embodiment discloses the structure relating to this novel system a better understanding of the invention will be possible by reference to the following.

To prepare for the retrieval of the deep submergence rescue vehicle from a depth below the wave action of the ocean the submarine rescue ship maintains a heading at zero speed to provide for the least motion of the capturing cables 22. The capturing cables 22 are suspended from the lower end of the articulated positioning arms 14, the lower ends of which are ball shaped. The TV, light array and sonar equipment contained on the sensor platform 24 is put into operation and controlled through the coaxial cables 26. The DSRV, from a submerged position, locates the retrieval cables utilizing its sonar, TV camera, and view ports. The vehicle, having its capturing arms 28 extended to a position forwardly and laterally from the hull of the vehicle, approaches them at a slow speed to capture these suspended capturing cables. Upon contact with these cables the capturing arms of the vehicle are retracted inwardly toward the hull to force the capturing cables into ball socket joint 31. Ball socket joints 31 enclose the cables 22 yet permit vertical sliding motion thus permitting the surface vessel and the deep submergence rescue vehicle to independently pitch and heave. The DSRV then corrects for proper alignment and buoyancy, at which time cables 22 are winched in to bring cone fitting 25, mounted on the suspended cables 22 into contact with the lower portion of the ball socket 31. The DSRV maneuvers into an ascent position and is hauled in. Hauling in is continued until the ball ends 15 of the positioning arms 14 engage their mating ball sockets 31 on the DSRV.

With the vehicle now at the surface and the ship at approximately zero speed heading into the sea, the positioning arms 14 are able to control the longitudinal and transverse motion of the vehicle for aligning the hard lift points 40 on the vehicle with the elevator cradles 32, while still allowing the vehicle freedom to heave and pitch. The forward and aft elevators 30, are then rotated into the position shown in FIGS. 1 and 2, and the final alignment of the DSRV's hard lift points 40 is made. The elevator cradles 32 are then raised to contact the DSRV, which is lifted from the water. The positioning arms 14 are detached and retracted, and the vehicle is raised to the deck level, for subsequent transfer to a mating position over one of the decompression chambers 36 as is shown in FIG. 2. The occupants may then be transferred into the decompression chamber 36, to complete the rescue mission.

It was generally considered that to prevent wave slap while being hoisted through the air-ocean interface, the vehicle must be quickly snatched from the water surface. While this may be acceptable for light vehicles, the motion compensating concept of this invention is a more practical approach for the heavy and delicate vehicle contemplated in this invention. Accordingly, the elevator cradles 32 are raised in the U-shaped elevator arms 30 by means of hoisting systems which employ an over-running clutch technique and ram tensioners in the system.

Hence the lift mechanism has high speed, light lift capacity and a slow speed heavy lift capacity. Therefore, if a wave lifts the vehicle, the elevator speeds up to maintain lifting contact with the vehicle. When the wave recedes, the elevator will return to its normal slow speed heavy lift capacity hoisting speed. Elevator cradles 34 are provided with shock mitigating components which contact the under side of the DSRV to prevent hard impact which might damage the vehicle.

The procedure for launching the deep submergence rescue vehicle is substantially the reverse of the retrieval procedure described above, and requires no further comment.

It is to be understood that the invention is not limited to the exact detail of the construction shown and described for obvious modifications will occur to persons skilled in the art.

What is claimed is:

1. For underwater vehicles, a handling system on a surface vessel of the type having two laterally spaced apart hull portions separated by an opening over the water vehicles comprising:
    a positioning arm pivotally attached to said ship on each side of said opening for guiding said deep submergence vehicle at the air-sea interface;
    a capturing cable suspended into the water from each of said positioning arms for initial contact below orbital wave motion with said deep submergence rescue vehicle;
    a sensor platform suspended from the remote ends of said capturing cables for observation and orientation by said vehicle;
    a pair of elevator arms pivotally attached to said ship; and
    a movable elevator cradle slidably contained within each of said elevator arms for cradling said vehicle for subsequent lifting from the air-sea interface at the opening to a position above the water.

2. The handling system of claim 1, wherein said pair of elevator arms are longitudinally spaced in said opening and pivot fore and aft.

3. The handling system of claim 1 wherein said vehicle further comprises:
    a capturing arm pivotally attached on each side of said vehicle for rotation to a position tangential to the hull of said vehicle and parallel with its longitudinal axis to a position extending forwardly and outwardly from the hull for capturing said capturing cables.

4. The handling system of claim 3, wherein each of said positioning arms has atached thereto a ball end through which said capturing cables pass.

5. The handling system of claim 4 wherein said vehicle further comprises:
    a ball socket located adjacent the pivot point of each of said capturing arms for loosely encompassing said capturing cable and for receiving said ball end of said positioning arm.

References Cited

UNITED STATES PATENTS

| | | | |
|---|---|---|---|
| 3,373,711 | 3/1968 | Bader | 114—43.5 |
| 3,403,652 | 10/1968 | Hardy | 114—43.5 |

TRYGVE M. BLIX, Primary Examiner

U.S. Cl. X.R.

114—16